(12) United States Patent
Sagal

(10) Patent No.: US 6,620,366 B2
(45) Date of Patent: Sep. 16, 2003

(54) METHOD OF MAKING A CAPACITOR POST WITH IMPROVED THERMAL CONDUCTIVITY

(75) Inventor: E. Mikhail Sagal, Warwick, RI (US)

(73) Assignee: Cool Options, Inc., Warwick, RI (US)

( * ) Notice: Subject to any disclaimer, the term of this patent is extended or adjusted under 35 U.S.C. 154(b) by 34 days.

(21) Appl. No.: 10/026,256

(22) Filed: Dec. 21, 2001

(65) Prior Publication Data

US 2003/0117764 A1 Jun. 26, 2003

(51) Int. Cl.[7] .............................................. B29C 43/22
(52) U.S. Cl. ................. 264/272.11; 264/259; 264/263; 264/272.15; 264/275; 264/271.1; 29/25.01; 29/25.02; 29/25.03; 361/535; 361/536; 361/540
(58) Field of Search ................................ 264/259, 263, 264/272.11, 272.15, 275, 271.1; 29/25.01, 25.02, 25.03; 361/535, 536, 540

(56) References Cited

U.S. PATENT DOCUMENTS

| | | | |
|---|---|---|---|
| 3,992,761 A | * 11/1976 | McElroy et al. ........... 29/25.42 |
| 5,129,448 A | 7/1992 | Holmberg, Jr. et al. ....... 165/86 |
| 5,430,609 A | 7/1995 | Kikinis ........................ 361/687 |
| 5,513,070 A | 4/1996 | Xie et al. .................... 361/700 |
| 5,552,960 A | 9/1996 | Nelson et al. ............... 361/687 |
| 5,557,500 A | 9/1996 | Baucom et al. ............. 361/687 |
| 5,606,341 A | 2/1997 | Aguilera ...................... 345/87 |
| 5,621,613 A | 4/1997 | Haley et al. ................ 361/687 |
| 5,646,822 A | 7/1997 | Bhatia et al. ............... 361/687 |
| 5,666,261 A | 9/1997 | Aguilera ..................... 361/681 |
| 5,708,566 A | 1/1998 | Hunninghaus et al. ...... 361/764 |
| 5,718,282 A | 2/1998 | Bhatia et al. ................. 165/86 |
| 5,757,615 A | 5/1998 | Donahoe et al. ............ 361/687 |
| 5,764,483 A | 6/1998 | Ohashi et al. ............... 361/699 |
| 5,781,409 A | 7/1998 | Mecredy, III ............... 361/687 |
| 5,790,376 A | 8/1998 | Moore ......................... 361/700 |
| 5,796,581 A | 8/1998 | Mok ............................ 361/687 |
| 5,818,693 A | 10/1998 | Garner et al. ............... 361/700 |
| 5,822,187 A | 10/1998 | Garner et al. ............... 361/687 |
| 5,828,552 A | 10/1998 | Ma ............................. 361/704 |
| 5,832,987 A | 11/1998 | Lowry et al. ................. 165/86 |
| 6,432,344 B1 | * 8/2002 | Eckman et al. ............. 264/263 |

* cited by examiner

Primary Examiner—Angela Ortiz
(74) Attorney, Agent, or Firm—Barlow, Josephs & Holmes, Ltd.

(57) ABSTRACT

The present invention provides an improved electrolytic capacitor device and a method of constructing the same. The capacitor includes a central support post that is inserted into an arbor hole in the center of the active element. The present invention provides a capacitor post that has a core material of metal or thermally conductive polymer that has an outer protective layer formed thereon. The outer protective layer is net shape insert molded over the core using a thermally conductive, electrically insulative polymer material that protects the support core from interfering with the electrical operation of the capacitor while increasing the capacitor's ability to transfer waste heat from the active element to the exterior of the device. The outer layer further includes an integrally formed thermal transfer pad that resides adjacent to the outer can of the capacitor when the capacitor post is installed. The method of the present invention provides for net shape injection molding the protective layer over the inner core component to provide a composite support post having an integral thermal interface pad for incorporation into the finished capacitor device.

5 Claims, 2 Drawing Sheets

METHOD OF MAKING A CAPACITOR POST WITH IMPROVED THERMAL CONDUCTIVITY

BACKGROUND OF THE INVENTION

The present invention relates to a capacitor post for use within a large high voltage capacitor, and more particularly to a capacitor core post for use within a capacitor that has electrically insulative properties while also having thermally conductive properties to improve the heat dissipating properties between the internal active elements of the capacitor foil roll and the package (or can) in which the capacitor is encased. The improved capacitor construction of the present invention provides improved heat dissipation for a capacitor and an economical construction adaptable to automated large-scale manufacturing.

Electrolytic capacitors, and specifically aluminum electrolytic capacitors, generate internal heat during operation because of fluctuating current ("ripple current") and internal resistance (Effective Series Resistance—"ESR"). The heat is generated internally in the active element of the roll and must diffuse outward to the packaging (or can) before it can be carried away by convection, conduction and/or radiation to the ambient environment. Radial and axial heat flows serve to conduct the heat from the core of the capacitor to the sides and bottom of a cylindrical package in which the capacitor may be encased. Construction details of the capacitor can facilitate or introduce resistance to these heat flows. Thus, it is desirable to use construction designs for capacitors which minimize the addition of internal resistance and which facilitate the conduction of heat from the core to the outside environment.

Traditionally, the capacitance of a capacitor, among other parameters, determines the required dimensions and size of the roll. In the past, the smallest arbor hole (or center opening) possible was used to maximize the amount of foil in the capacitor roll while minimizing the size of the package or can required to enclose the roll, thus producing a dense roll that allowed little heat to dissipate through the arbor hole. In addition, a common construction technique employed with this design involved the use of a "potting" material between the capacitor and the can to aid in anchoring the roll. The practice involves embedding the roll in asphalt, wax, etc. While potting anchors the roll, it does not promote efficient heat flow from the roll to the can, because the potting materials are generally insulators. Accordingly, the heat must pass through the large thermal resistance of the insulating potting compound before being diffused to the package.

Another known construction technique involves the use of indentations in the can or packaging of the capacitor to assist in anchoring the roll and to promote heat transfer through the increased contact surface area between the can side wall and the roll at multiple points (called "rilled construction"). However, a paper layer is normally wound around the outer surface of the active element (the portion of the roll where the two electrodes are present) and is thus interposed between the active layers of the roll and the can. This interposed paper layer contributes to the internal thermal resistance. This practice is particularly detrimental when the active element is small and several layers of paper must be used.

Other methods of construction employ a variable arbor hole to control the roll diameter for a snug fit into the can and leave a predetermined void volume in the center of the roll for gas buildup. The use of a large variable arbor has proven to be impractical and abandoned as a commercial technique due to difficulties in process control and collapse of the resulting un-supported arbor hole (which leads to elevated ESR of the capacitor). In addition, the close control of the roll diameter required a varying number of extra turns of paper on the exterior of the roll (contributing to heat buildup) unless a very highly variable mandrel was used. Moreover, an adequate press fit between the roll and the can is almost impossible to manufacture when a variable mandrel was used. Without an extremely good press fit, small air gaps result between the can and the surface of the roll and act as insulators, thus contributing to internal resistance.

Another technique describes the use of a small air gap between the exterior of the roll and the can with indenting (rilling) of the can to force mechanical and thermal contact at a number of points around the periphery of the roll. In addition, an indentation in the can bottom was included to help support the arbor hole against collapse. A low profile roll was also used in an attempt to shorten the axial thermal path to the can bottom and to limit the collapse of the arbor hole. Again, this construction suffers from several commercial disadvantages and was never widely practiced due, in part, to manufacturing implementation problems and arbor hole collapse.

Presently, a number of manufacturers offer variations of the techniques set forth above. The variations focus on extracting heat from the roll via extended cathode foils that reach and contact the can bottom. These designs provide for rolls that mostly fill the can and are wound on standard diameter mandrels; therefore, there are air gaps around the roll periphery. The cathodes are extended down beyond the anode foil to contact the can bottom. The roll is anchored by compression between the cover and the can bottom. Currently available capacitors based on the extended cathode and the rilled can construction techniques typically do not incorporate large arbor holes. Instead, extra paper is wound around the outside of the active element to permit the can to be indented (rilled) for anchoring the roll. The disadvantage of these practices is that the heat dissipation is mainly forced into the axial direction down the cathode foils to the can bottom. Thus, these designs suffer by stifling radial heat flow.

In an effort to employ the above techniques, yet minimize the occurrence of collapsing the central arbor hole, prior art capacitors have employed metallic posts inserted within the center of the capacitor. The post thereby provides a solid core to prevent collapse of the arbor hole while providing a thermal path through which heat can be dissipated. The capacitor posts of the prior art are typically made of a metallic material and typically include a plate at the lower-most end. However, these prior art capacitor posts and mounting plates must be electrically insulative for proper operation of the capacitor. The metallic prior art capacitor post/plate structure is commonly powder coated to make it electrically insulative. However, such powder coating is expensive and time consuming to carry out.

Therefore, there is a need for an electrolytic capacitor support core and a method of constructing the same in which internal thermal resistances are reduced and heat dissipation from the core or center of a capacitor to the packaging is increased. There is also a need for a capacitor core that is injection moldable from thermally conductive, electrically insulative polymer materials to provide a more effective path for transfer of heat from the active element of the capacitor.

SUMMARY OF THE INVENTION

The present invention provides for a novel assembly and method of constructing an electrolytic capacitor in which the dissipation of heat from the active elements of the capacitor is increased. The capacitor post assembly of the present invention has many advantages over prior art posts in that it maintains the metallic core for support of the arbor hole in the roll and for heat transfer from the core of the capacitor in addition to having an integrally formed electrical insulation component. The post is preferably insert injection molded from thermally conductive polymer materials, which enables the part to be inexpensively made in large quantities. However, other molding techniques known in the art may also be used.

The method of the present invention provides a method for manufacturing a capacitor core that includes fabricating an inactive core element to one or more predetermined dimensions and net shape insert molding a layer of thermally conductive, electrically insulative polymer over the core element. In addition, a thermally conductive transfer pad is integrally molded with the polymer layer to improve thermal transfer from the capacitor when assembled and installed in an electronic assembly. The composite core element may be an arbor upon which the capacitor element is wound, capable of remaining in the capacitor after assembly without affecting operation of the capacitor. In addition, the core element may be inserted into an opening within the outer can housing of the capacitor and fastened therein.

The invention also provides an improved core element for an electrolytic capacitor consisting of an inactive core element; and a net shape injection molded coating thereon having thermally conductive and electrically insulative properties and an integrally molded thermal transfer interface pad. The molding material of the present invention is a dielectric thermoplastic, such as an elastomeric polymer base, with a thermally conductive filler loaded therein. The filler may be carbon fiber, copper flakes, boron nitride, or the like. Since the polymer base is a dielectric, the molded portion of the post will be electrically insulative while still being thermally conductive.

The outer layer of the capacitor post of the present invention is preferably injected molded from a net shape moldable thermally conductive polymer composition. As the protective layer of the present invention, which is in contact with the other elements of the capacitor, is fabricated from elastomeric polymer materials it is lighter than the all metallic posts of the prior art and does not require machining to reach its final dimension. The present invention also has the advantage of being net shape moldable, meaning, the part that is created in the injection molding process does not require any further processing steps after it is removed from the mold and before it is incorporated into the finished device. Both the lighter weight and the net-shape moldability are distinct advantages over the prior art where metallic parts had to be machined in several steps to achieve the desired part geometry.

Therefore, it is an object of the present invention to provide a capacitor post structure that can be employed without powder coating. It is also an object for such a structure to be thermally conductive to assist in the cooling of the capacitor during operation both through providing a thermal transfer pathway to the central core and an integral thermal transfer interface pad between the capacitor can and the mounting substrate onto which the capacitor is mounted. It is also an object of the present invention to provide an electrolytic capacitor, which increases the efficiency of the flow of heat from the active elements of a capacitor in both the radial and axial directions. It is also an object of the invention to provide a support for the arbor hole, which is highly thermally conductive while also being electrically insulative. Further, it is an object of the invention to provide a capacitor support post construction, which can be easily and inexpensively manufactured.

These and other objects and advantages will become apparent to those skilled in the art upon a reading of the present disclosure. The invention will be better understood by reference to the following description taken in conjunction with the accompanying drawings.

BRIEF DESCRIPTION OF THE DRAWINGS

The following drawings illustrate the best mode presently contemplated for carrying out the present invention.

DETAILED DESCRIPTION OF THE INVENTION

Figure 1:
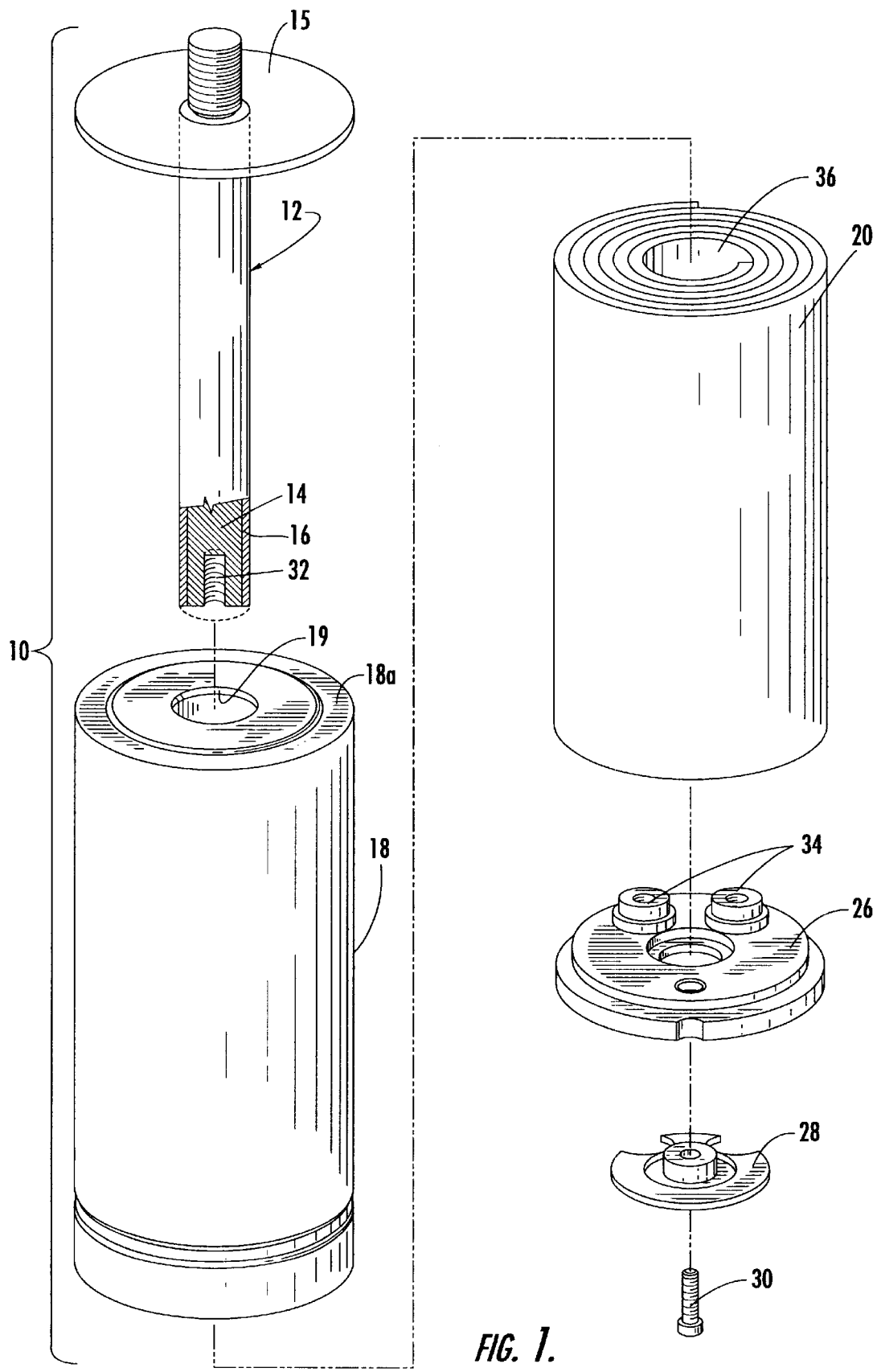
FIG. 1 is an exploded perspective view of the capacitor manufactured in accordance with the present invention.
Figure 2:
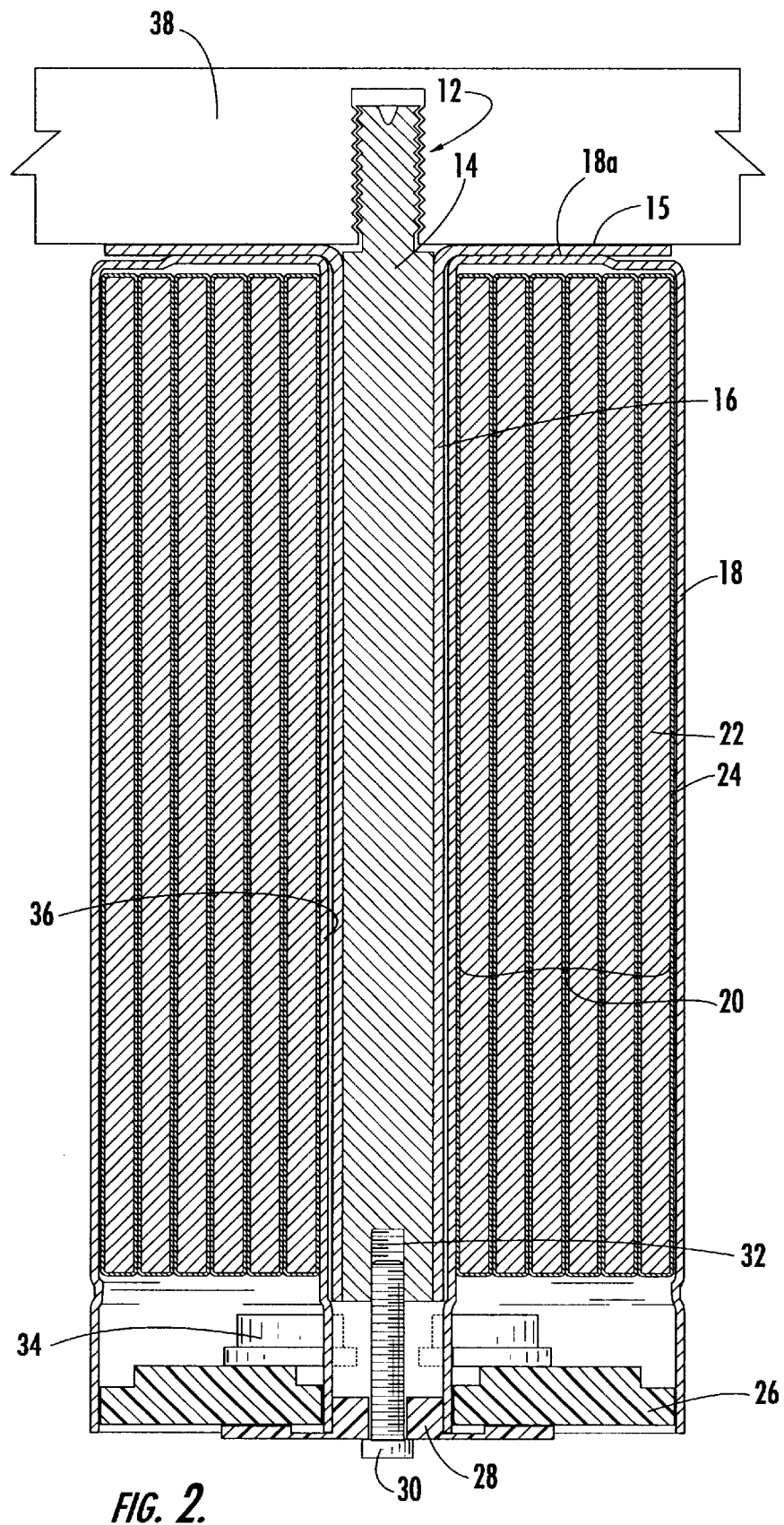
FIG. 2 is a cross sectional view thereof.

Referring now to the drawings, the preferred embodiment of the capacitor post of present invention is shown in FIGS. 1 and 2. The overall capacitor assembly of the instant invention is illustrated and generally indicated at 10 in FIGS. 1 and 2. As will hereinafter be more fully described, the instant invention utilizes a metallic post insert molded with a coating of thermally conductive, electrically insulative polymer to provide a novel and improved capacitor construction that allows heat to be transferred efficiently from its core. In addition, the molded coating includes an integral thermal interface pad that extends over one end of the capacitor assembly to facilitate the transfer of heat from the capacitor when it is mounted in an operable assembly.

In FIG. 1, an exploded perspective view of the preferred embodiment is shown to include an electrolytic capacitor device 10. The capacitor 10 includes an inactive capacitor post element 12 having a central metallic core 14 and an outer thermally conductive, electrically insulative polymer coating 16. Integrally molded with the polymer coating 16 is a thermal interface pad 15. The capacitor device has an outer housing or can 18 that has a hole 19 in its center to receive the capacitor post 12. The active element of the capacitor 10 is a roll 20 that consists of a laminate of conductive foil 22 and insulative material 24 tightly rolled and inserted into the can 18. A cap 26 is placed into the bottom end of the can 18 after the roll 20 is inserted into the can 18. A retaining clip 28 is further inserted into the cap 26 and fastened with a screw 30 that engages the end of the capacitor post element 12 in a threaded opening 32 located in the lower end of the central metallic core 14. Connection points 34 are provided in the cap 26 that are in electrical communication with the roll 20 that allow the capacitor 10 to be operatively connected and function in an electronic device. Further details of the electrical interconnection of the components are not shown herein as such details are well-known in the art.

In the process of constructing the capacitor 10, an arbor (not shown) is used to roll the laminate material 22, 24 into a tightly compressed package for use as the active roll 20 in the capacitor 10. Before the roll 20 is installed in the can 18 the arbor is removed leaving an arbor hole 36 in the center of the active roll 20. This arbor hole 36 is unsupported and susceptible to allowing one or several layers of laminate material 22, 24 to collapse into the void thus interfering with the proper and efficient operation of the capacitor 10. In addition, the active roll 20 is wrapped very tightly to maintain as small and tight an overall package as possible.

This tight wrapping creates a dense mass of electrically active material that generates a great deal of heat during the operation of the capacitor 10. Because of the compact geometry of the active roll 20 it is difficult to dissipate the heat that is generated. The active roll 20 is supported about its periphery by the can 18 itself. In addition, the portion of the can 18 about the arbor hole 36 needs to be supported as well to prevent it from collapsing internally.

The inactive capacitor post 12 serves both the function of supporting the arbor hole 36 and dissipating heat from the interior of the active roll 20. The integral interface pad 15 further assists in dissipating heat away from the capacitor 10 by conducting heat both from the polymer coating 16 and from the bottom of the can 18 namely via surface 18a. The capacitor post 12 has two distinct layers. The first is a core element 14 that is typically a metallic material such as aluminum, but may be any metallic material. In addition, the core element 14 could be fabricated from a highly thermally conductive polymer composition of one of the types described below. The second layer is a polymer coating layer 16 on the outer surface of the core element 14 which has an integrally formed thermal transfer pad 15. The polymer coating 16 is a thermally conductive polymer with highly dielectric properties. The polymer coating 16 is preferably net shape insert molded onto the core element 14 but could be formed using other forming techniques. The polymer coating about the core element 14 is preferably 0.030 inches thick but may be thicker or thinner depending on the desired thermal conductivity of the part and the conductive properties of the polymer. Also, the integral interface pad 15, in the configuration of a flange is preferably 0.030 inches thick and 3 inches in diameter to accommodate the top surface 18a of the can 18, but the pad 15 may be thicker or thinner or larger or smaller in diameter depending on the application, namely the size and configuration of the can 18. For example, in high thermal conductivity applications the polymer coating 16 would be as thin as allowed by the dielectric strength of the polymer material. The dielectric properties of the polymer coating 16 are critical to the proper functioning of the capacitor 10 in that the core 12 must be electrically inactive to remain in place in the center of the active roll 20 without causing an unintended discharge of the capacitor 10 through a pathway other than the electrical contacts 34.

In accordance with the present invention, the capacitor post 12 is used as a thermal conduit within the capacitor 10. In addition, the thermal transfer pad 15 that is integrally formed with the outer layer 16 is disposed between the top surface 18a of the can 18 of the capacitor 10 and the thermally conductive mounting structure 38 to which the capacitor 10 is mounted in operable relation, thereby providing a highly compressible thermal interface between the can 18 and mounting structure 38 allowing additional heat to be dissipated from the active roll 20 to the thermally conductive mounting structure 38 with the thermal interface pad 15 residing therebetween.

Preferably, the capacitor post 12 is manufactured using a metallic core element 14 and an outer layer 16 a thermally conductive net-shape insert molded polymer composition. The polymer layer 16 and integral thermal interface pad 15 are net-shape molded which means that after the part is molded, such as by insert molding, further machining of the part is not necessary because it has been molded into its final shape and configuration as actually used. The polymer composition that is preferred includes a polymer base matrix such as an elastomeric polymer. The polymer is preferably loaded with thermally conductive filler, such as carbon fiber, copper flakes, boron nitride powder, and the like. Since the dielectric properties are critical, other fillers such as chopped glass may be added to enhance the dielectric properties of the overall polymer composition. In addition, the ratios in which the other fillers are used may be adjusted as is well known in the art to enhance the dielectric properties of the overall composition while maintaining high thermal conductivity.

It can be seen in FIG. 2, that in its operative position, the capacitor post 12 is in thermal communication with the center of the active roll 20 and provides a thermally conductive pathway from the center of the capacitor 10 to the exterior of the capacitor 10. In addition, the integral thermal interface pad 15 is in contact with the outer can 18 of the capacitor 10 to provide further thermally conductive pathways for heat to be effectively dissipated from the capacitor 10 assembly. In this way, the capacitor post 12 can be further attached to a heat sink (not shown) or an other heat dissipation element such as the mounting structure 38 in FIG. 2 to further improve the quantity of heat removed from the capacitor 10 while it is in operation while the thermal interface pad 15 will be compressed between the surface of the can 18 and the attached heat sink allowing additional heat dissipation capacity. It can also be seen that the capacitor post 12 is in close proximity to the operative components of the capacitor 10 emphasizing the need for the polymer outer layer 16 to provide the dielectric properties necessary not to interfere with the electrical operation of the capacitor 10.

It is also possible that the capacitor post 12 be manufactured from a unitary molded member of a thermally conductive, electrically insulative polymer or the like. For example, a polymer base matrix loaded with thermally conductive filler material, such as PITCH-based carbon fiber, may be employed as the material for the present invention. Such unitary construction is unlike that found in the prior art and provides significant advantages including low cost, ease of manufacture and flexibility of heat geometry due to the ability to mold the assembly as opposed to machining it. The post 12 and coating 16 thereon preferably extends through the entire length of the arbor hole 36. However, in certain applications, it may be desirable to have a shortened post 12 that further receives an additional post or other structure (not shown).

The method of the present invention provides for a new method of manufacturing an electrolytic capacitor 10 having an inactive capacitor post 12. A highly thermally conductive core element 14 is provided that may be metallic material or highly thermally conductive, electrically conductive polymer. A layer of thermally conductive, electrically insulative polymer 16 having high dielectric properties is net shape injection molded around the outer surface of the core element 14 and includes an integral thermal transfer interface pad 15. The capacitor post 12 is inserted into the center of the outer can 18 of a capacitor 10 with the interface pad 15 adjacent to the bottom of the can 18. The active element 20 of the capacitor 10 is inserted into the can 18 with the capacitor post 12 residing in the arbor hole 36 at the center of the roll 20.

It can therefore be seen that the instant invention provides a novel construction and method of manufacturing a capacitor 10 having an improved inactive capacitor post 12 that is highly thermally conductive while providing high dielectric properties to allow the capacitor post 12 to remain in the center of the capacitor 10 while in operation. The capacitor post 12 providing a thermal dissipation pathway for the heat generated in the active element 20 of the capacitor 10 during operation while further providing an interface pad 15 for transferring heat from the capacitor 10 can 18 to an adjacent thermally conductive body. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A method of fabricating a core element for a capacitor, comprising the steps of:

providing a solid central core element having an outer surface;

providing a base polymer matrix material;

providing a filler material;

mixing said filler material with said base matrix into a mixture; and insert molding said mixture onto said outer surface of said central core element to form an outer polymer coating, said coating having a terminal end; and molding a thermal transfer interface pad integrally formed with and in thermal communication with said polymer coating at said terminal end, said interface pad extending from said outer surface of said central core element in an outward radial direction.

2. The method of claim 1, wherein said step of providing a filler material is providing a filler material that is thermally conductive and electrically insulative.

3. The method of claim 1, wherein the filler material is selected from the group consisting of: carbon fiber, chopped glass, boron nitride, metallic flakes, alumina and mixtures thereof.

4. The method of claim 1, wherein said base polymer matrix material is dielectric.

5. The method of claim 1, wherein said base polymer matrix is elastomeric polymer.

* * * * *